United States Patent [19]
Inoue et al.

[11] 3,806,239
[45] Apr. 23, 1974

[54] ORIGINAL TRANSPORT DEVICE

[75] Inventors: Shozo Inoue; Tadashi Sato; Takeki, all of Nagaoka, all of Tokyo; Kazumi Umezawa, Yokohama, all of Japan

[73] Assignee: Canon Kabushiki Kaisha, Tokyo, Japan

[22] Filed: July 18, 1972

[21] Appl. No.: 272,894

[30] Foreign Application Priority Data
Japan .............................. 46/54881

[52] U.S. Cl. ............................... 355/8, 355/50
[51] Int. Cl. .................................. G03b 27/50
[58] Field of Search ................ 271/3; 355/8, 50, 51

[56] References Cited
UNITED STATES PATENTS
3,510,218  5/1970  Limberger ............................. 355/51
3,588,244  6/1971  Murgas ................................... 355/8
3,677,635  7/1972  Van Auken ............................ 355/51

*Primary Examiner*—John M. Horan
*Attorney, Agent, or Firm*—Fitzpatrick, Cella, Harper & Scinto

[57] ABSTRACT

An original transport device for use with an electrophotographic copying apparatus or the like comprises a first drive transmission means for operating a sheet original transport unit removably mounted to the copying machine adjacent to the slit portion thereof, and a second drive transmission means for moving an original carriage. The first and second drive transmission means are driven from a drive source in the copying apparatus. The sheet original transport unit, when mounted, is actuated by receiving the drive from the first drive transmission means. The original carriage is movable by the second drive transmission means when the sheet original transport unit is removed from the copying apparatus.

6 Claims, 10 Drawing Figures

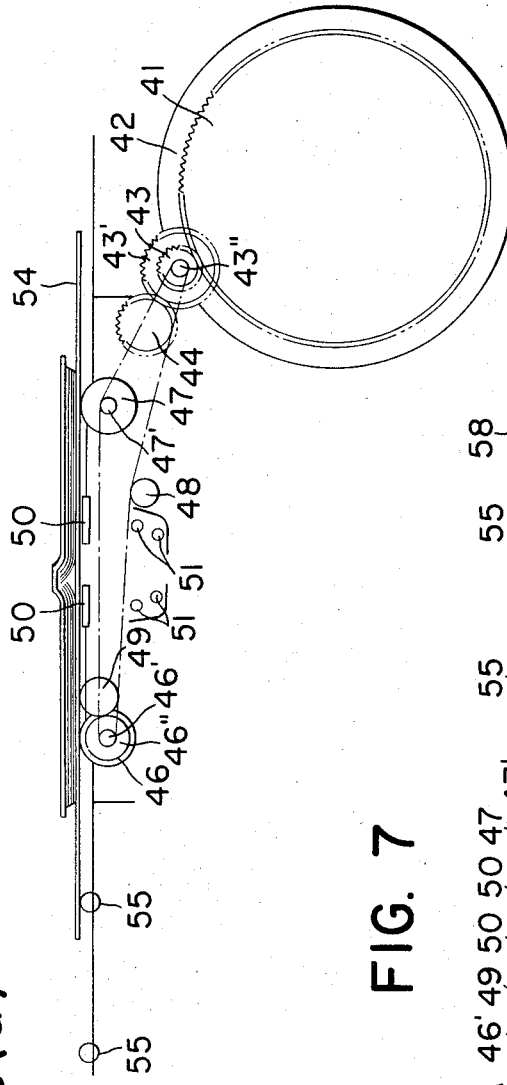
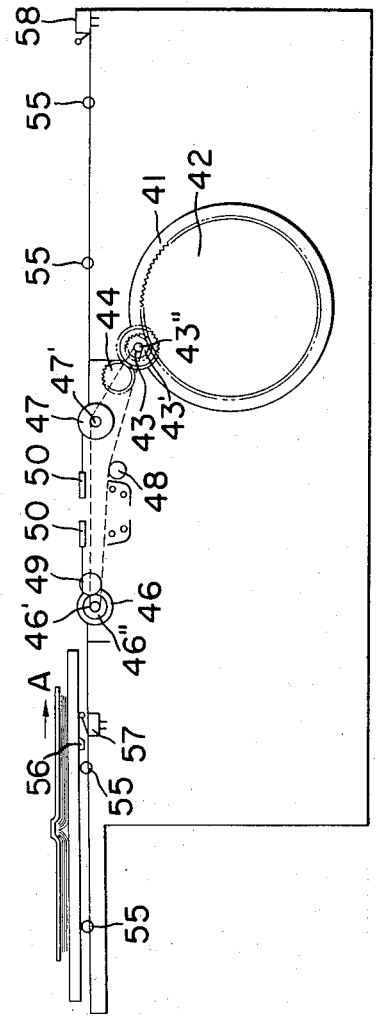
FIG. 6(a)
FIG. 7

ORIGINAL TRANSPORT DEVICE

BACKGROUND OF THE INVENTION

1. Field of the Invention

This invention relates to an original transport device for use with an ordinary copier such as electrophotographic copying apparatus or the like. More specifically, it relates to an original transport device provided with original transport means exclusively for use with thicker originals and original transport means exclusively for use with sheet originals so as to enable these different types of originals to be copied at a high speed with a single copying apparatus.

2. Description of the Prior Art

The copying machine has conventionally been classified into two types, i.e., the type which is exclusively for use with sheet originals and the type which is capable of copying books or other three-dimensional originals.

The copying machine of the former type cannot copy books and other thicker originals but it can produce copies of sheet original simply by inserting such original through an inlet and can enhance the copying speed as much as about twice because it involves no return stroke of an original carriage or an optical system for the same process. In addition, this type of machine is simpler in construction and lower in cost. Moreover, it can readily be reformed into a construction of the type which is equipped with an automatic original supply device.

The latter type, i.e., the machine which can copy books or other thicker originals, has a great feature that it can also copy sheet originals, but it structurally requires that any original to be copied should be spread flatly over the original carriage, and this is true with a sheet original as well as with a thicker original. More specifically, when a sheet original is to be copied, such original must be placed on a original supporting glass by raising an original keep cover and closing the cover again, whereafter a copy button must be depressed to copy the sheet original, just as required to copy a thicker original. Furthermore, the presence of the return stroke of the original carriage or the optical system results in a corresponding loss of time and necessarily in a reduction of the copying speed for the same process. Moreover, the mechanical construction is more complex and the cost of the machine is higher. In addition, this type of machine will encounter great difficulties when it is reformed into a construction of the type which is equipped with an automatic original supply device.

The copying machines of the described two different types have enjoyed their own unique markets.

In most offices, however, copies of sheet originals are needed more often than copies of thicker original. In these situations, therefore, the offices had to sacrifice the simplicity of the sheet original copier and to newly buy a thicker original copier which is more expensive.

SUMMARY OF THE INVENTION

It is therefore an object of the present invention to provide an improved original transport device which enables various types of originals to be copied at a very high speed.

It is another object of the present invention to provide an original transport device which gives a copying apparatus both a function as a high-speed sheet original copier and a function as a thicker original copier.

It is still another object of the present invention to provide an improved original transport device which enables copying to be effected smoothly by a very simple operation when the original to be copied is frequently changed between a sheet original for high-speed copying and a thicker original.

It is yet another object of the present invention to provide an improved original transport device which enables a common optical system to be used for high-speed copying of sheet originals and for copying of thicker originals.

The original transport device of the present invention will be outlined hereunder.

According to the present ivention, when a sheet original is to be copied, the movable original carriage is not used but a sheet original transport unit is assembled to the exposure station of a copying apparatus to copy the sheet original. When a thicker original such as book or three-dimensional original is to be copied, the sheet original transport unit is removed from the exposure station and the original carriage is operated to copy the thicker original. The optical exposure system in the copying apparatus may be used for both transport means and a common drive transmission means may be used for transmitting the drive from the copying apparatus body to the two transport means.

BRIEF DESCRIPTION OF THE DRAWINGS

The invention will be more fully described in conjunction with the accompanying drawings, in which:

FIG. 7 is a view for illustrating the operation of the movable original carriage.

DESCRIPTION OF THE PREFERRED EMBODIMENTS

Figure 1:
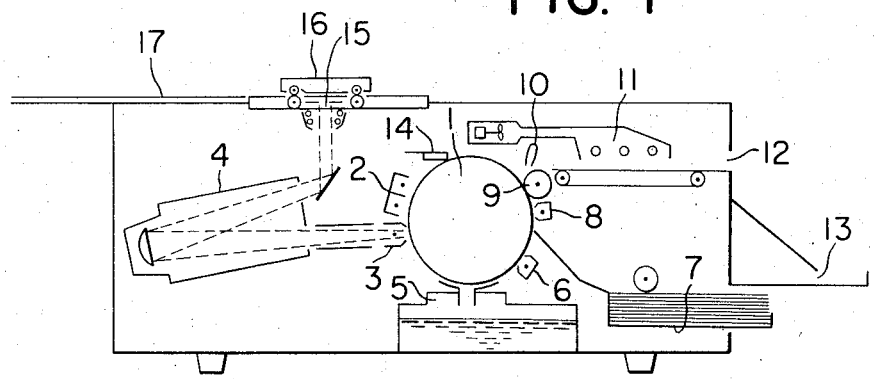
FIG. 1 schematically illustrates an embodiment of the copying apparatus to which the original transport device of the present invention has been applied.

Referring to FIG. 1, there is shown an example of the electrophotographic copying apparatus with an original transport device of the present invention mounted thereto. The copying apparatus includes a photosensitive drum 1 comprising a dielectric or insulating layer, a photoconductive layer and a conductive back-up member. Primary charger 2 may uniformly charge the surface of the photoconductive drum 1, and secondary charger 3 may apply a charge of the opposite polarity or AC corona discharge to the drum surface simultaneously with application of original image light through optical means 4 for exposing the drum surface to the original image light. Wet or dry type developing means 5 is provided to develop an electrostatic latent image formed on the drum surface, although the developing means is shown as the wet type in the drawing. A post-charger 6 may electrically squeeze an amount of developing liquid remaining on the surface of the photosensitive drum after dveloped. Sheets of transfer paper may be fed from a transfer paper stock table 7 to the developed photosensitive drum. An image transfer charger 8 and an image transfer roll 9 are also provided. After image transfer, the sheet of transfer paper may be separated from the surface of the photosensitive drum 1 by separator means 10 and delivered to a fixing station 11 for fixing, whereafter the transfer paper may be discharged through an outlet onto a tray 13. After image transfer, the photosensitive drum 1 may be cleaned for reuse by blade type cleaning means 14.

In the arrangement described above, an exposure station 15 is provided with a sheet original transport unit 16 generally designated by numeral 16. When the transport unit 16 is assembled to the copying apparatus, an original carriage 17 rests at the shown position. For a thicker original to be copied, the unit 16 may be removed to bring the original carriage 17 into its position for use.

Figure 2A:
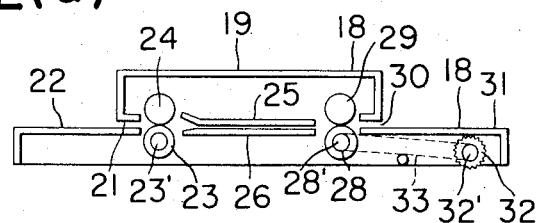
FIG. 2a and b are a sectional view and a perspective view, respectively, of the sheet original transport unit.
Figure 3:
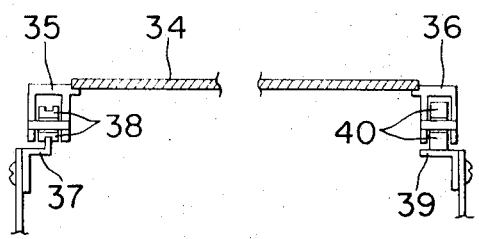
FIG. 3 is a sectional view of the movable original carriage.

FIGS. 2a and b show a sectional view and a perspective view, respectively, of the sheet original transport unit as removed from the coying apparatus body, and FIG. 3 shows a sectional view of the original carriage. As shown in FIGS. 2a and b, the sheet original transport unit includes a frame 18 which comprises an upper lid 19 and side walls 20. A sheet original inlet 21 is provided with a sheet original guide plate 22 forming a part of the frame 18. When inserted into the inlet 21, a sheet original may be nipped between a first sheet original transpot roll 23 and a first auxiliary roll 24 urged into contact with the roll 23 to cooperate therewith so that the sheet original may be transported into an exposure station, which comprises a sheet original guide plate 25 and a guide plate 26 of transparent material. The sheet original passes through the exposure station, where exposure is effected through a slit mounted to the copying apparatus body, and thereafter the sheet original may be passed between a second transport roll 28 and a second auxiliary roll 29 and through a discharge port 30 onto a discharge guide plate 31 forming a part of the frame. A gear 32, secured integrally to the sheet original transport unit, constitutes a drive receiving gear for transmitting the drive from the interior of the copying apparatus to the second roll 28 of the unit. The drive transmission from the drive receiving gear to the second roll may be accomplished by a belt 33 extending between a gear 32' integral with the drive receiving gear 32 and a gear 28' integral with the gear 28. A gear 23', formed integrally with the first roll 23, may be engaged with a drive portion to drive the roll 23 when the transport unit is assembled to the copying apparatus body. The first roll 23, the first auxiliary roll 24, the second roll 28, the second auxiliary roll 29 and the drive receiving gear 32 are all rotatably journalled to the side walls of the frame. The guide plate 25 and the transport plate 26 are securely attached to the frame.

The sheet original transport unit as described above may be freely removed from the copying apparatus when it is not in use.

In FIG. 3, which illustrates the movable original carriage in cross section, a transparent plate 34 is provided to support a thick original thereon. Attached to the opposite sides of the transparent plate are frames 35 and 36 which respectively support rollers 38 movable along an anti-oblique-running rail 37 and rollers 40 rotatably movable along a rail 39 for smoothly moving the original carriage.

In the above-described sheet original transport unit and thicker original carriage, the present invention particularly provides an accord between the position of an original surface during the use of the sheet original transport unit and the position of an original surface during the use of the movable original carriage, said two positions lying at the same focal point in the optical system for exposure.

In other words, the sheet original transport roll 23, 28 and the original carriage transport rolls 46, 47 are not common but are separate from one another and these rolls may be variable in level to thereby make the transparent plates 26 and 34 flush with each other. Moreover, the two transparent plates are made equal in thickness and refractive index.

This may more specifically be explained with reference to FIGS. 5 and 6. As shown there, the sheet original transport unit is arranged such that the surface of contact between the first roll 23 and the first auxiliary roll 24, the surface of contact between the second roll 28 and the second auxiliary roll 29, and the upper surface of the transparent plate 26 are all flush with one another, and that the upper surfaces of rolls 46, 47 for transporting the original carriage during the use of this carriage are lower than the upper surfaces of the first roll 23 and second roll 28 by an amount equal to the thickness of the transparent plate 34.

Figure 4:
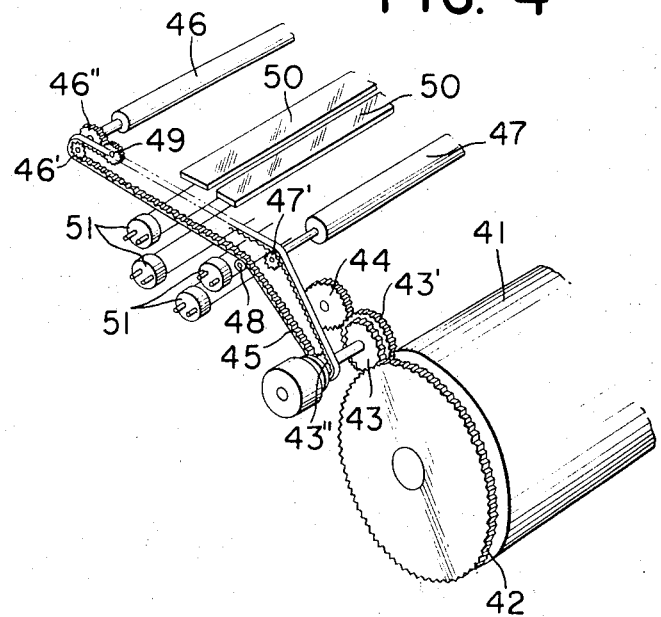
FIG. 4 is a perspective view showing the construction of the drive portion of the copying apparatus for driving the original transport device.

With reference to FIG. 4, discription will now be made of the drive portion of the copying apparatus with the sheet original transport unit and the original carriage removed therefrom.

Figure 2B:
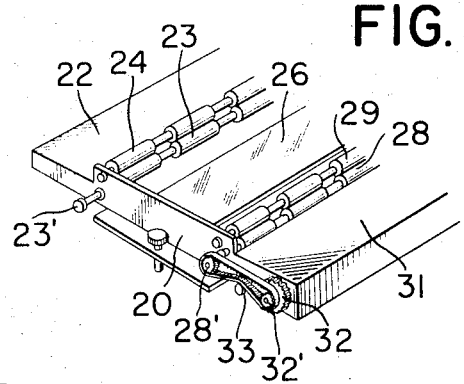

In FIG. 4, numeral 41 designates a photosensitive drum already shown in FIG. 1 and numeral 42 designates a drive gear formed integrally with the photosensitive drum. Numeral 43 denotes a drive transmission gear for imparting the drive from the drive gear to the sheet original transport unit and to the movable original carriage. A gear 43' formed integrally with the gear 43 is in meshing engagemet with an intermediate gear 44 which in turn is in meshing engagement with the drive receiving gear 32 of FIG. 2 to rotate the second roll of the aforesaid unit. On the other hand, a gear 43'' integral with the drive transmission gear 43 is connected by means of a transmission belt 45 to gear portions 46', 47' integral with first and second rolls 46, 47 for transporting the original carriage. An auxiliary gear 48 is provided. The sheet original transport roll 23 is such that a gear integral therewith is in meshing engagement with an intermediate gear 49 which in turn is in meshing engagement with a gear 46'' integral with the original carriage transport roll 46, thereby transmitting the drive to the transport roll 23. Below a slit 50 is disposed a light source means 51 for illumination.

In FIG. 4, the rotary shaft of the photosensitive drum 41 and drive gear 42, the rotary shaft of the drive transmission gear 43, the rotary shaft of the intermediate gear 44, the rotary shaft of the auxiliary gear 48, the rotary shaft of the first and second original carriage transport rolls 46, 47, and the rotary shaft of the intermediate gear 49 are all journalled to the unshown frame of the copying apparatus body.

By the transmission system as described above, the sheet original transport unit and the movable original carriage may be driven to accomplish smooth transport of sheet original and thicker original.

Figure 5A:
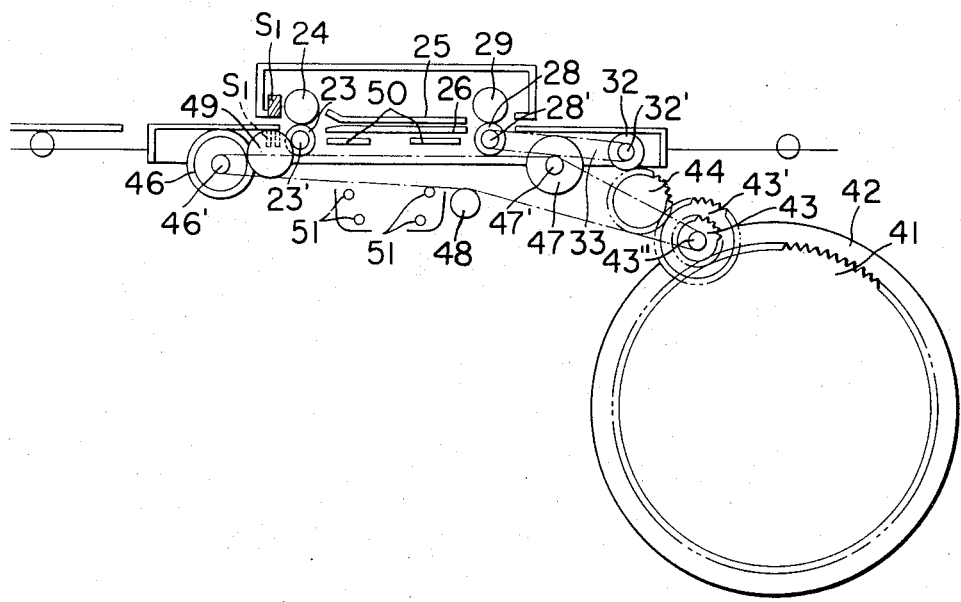
FIGS. 5a and b are a sectional view and a perspective view, respectively, of the sheet original transport unit as it is assembled to the copying apparatus body.
Figure 5B:
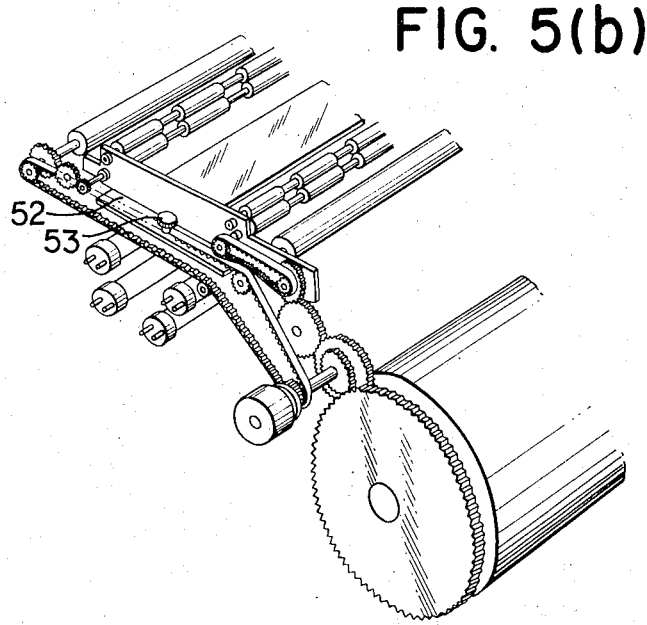
Figure 6B:
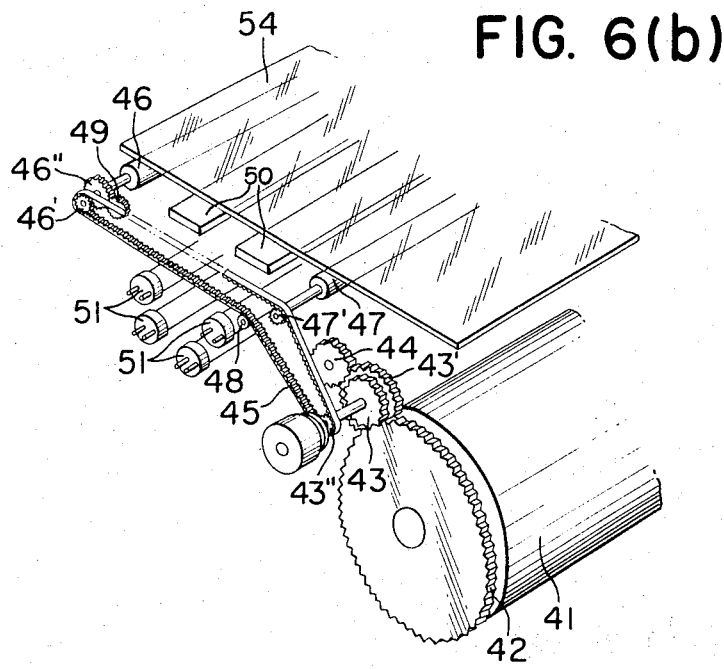
FIGS. 6a and b are a sectional view and a perspective view, respectively, of the original carriage as it is assembled to the copying apparatus.

FIGS. 5a and b show a sectional view and a perspective view, respectively, of the drive portion of the copying apparatus with the sheet original transport unit assembled thereto, and FIGS. 6a and b show a sectional view and a perspective view, respectively, of such drive portion with the movable original carriage applied thereto. As can be seen clearly from each of FIGS. 5a, 6a and 7, the apparatus disclosed herein provides means wherein the image surface of both sheet originals and thick originals pass through the same imaging plane during slit exposure. This is effected, as shown in FIG. 5a, by providing different elevations of the sheet original drive rollers 23 and 28 as compared to the drive rollers 46 and 47 of the thick original support plate 54, thus compensating for the thickness of the support plate 54.

When the sheet original transport unit is assembled to the drive portion of the copying apparatus, the gear 23' integral with the first roll 23 of the unit is engaged with the intermediate gear 49 of the drive portion and the gear 32 of the unit is engaged with the intermediate gear 44. Thereafter, when a sheet original is inserted through the sheet original inlet, such insertion of the sheet original is detected by detector means S1 to energize the drive source of the copying apparatus so that the first and second rolls 23, 24 and 28, 29 of the unit are rotated to transport the sheet original through the exposure station. The sheet original transport unit may be fixed to the unshown frame of the copying apparatus by means of screws 53 on a mounting plate 52 provided on either side of the frame.

Referring now to FIG. 6, the rolls and gears shown there operate in the same way as described above with respect to FIG. 4. The original carriage 54 may be supported by rotatable rolls 55 before and after exposure and may be supported on the carriage transport roll 46 during exposure so as to be operated by the drive from the apparatus body and by the self-moving force of its own, whereafter the carriage may be moved for exposure by the roll 47 rightwardly as viewed in the figure. Such movement of the original carriage takes place along the guide rails (FIG. 3) providd on the opposite sides of the top surface of the copying apparatus body. After the exposure, the original carriage may be automatically or manually returned to its start position for exposure.

The operation of the movable original carriage will now be described with reference to FIG. 7. Where a thicker original is to be copied by the use of the movable original carriage, the carriage may be manually moved to the copy start position in the direction of arrow A, whereby a projection 56 formed on the original carriage actuates to close the switch of copy start detector means. Thereby, the copying apparatus starts to operate and the original carriage is moved for exposure by the first and second original transport rolls 46, 47, thus accomplishing a copying operation. When the original carriage reaches a predetermined position upon completion of its forward stroke, the forward end of the carriage actuates the switch of forward stroke termination detector means 58. In response to this switch, a clutch mechanism mounted in the drive transmission gear cuts off the drive transmission from the drive source to the drive portion for moving the original carriage, thus permitting free rotation of the drive portion. Thus, the original carriage may be manually returned to its start position and the return to the start position may be detected to resume a copying cycle.

As has been described above with reference to the drawings, the sheet original transport means and original carriage of the present invention may be mounted as the original transport device for copying apparatus, thereby enabling not only thicker originals but also sheet originals to be continuously copied at a higher speed (about twice the speed attained by the prior art). Moreover, part of the movement of the original carriage may be achieved manually as well and this greatly reduces the length of time required for the return stroke, thus further enhancing the copying speed.

In the illustrated embodiment of the present invention, the drive transmitting portions of the drive transmitting rotary members have all been shown and described as gear head, but it should be understood that other transmission members may also be applicable.

We claim:

1. An original transport device for a photocopying apparatus having a slit-exposure device, comprising a sheet original transport unit removably mounted in opposed relation to said slit-exposure device, a first drive transmission means for operating said sheet original transport unit and being provided adjacent to said slit-exposure device for advancing a sheet original through a predetermined plane for slit-exposure, wherein said first transmission means is disposed in a coplanar relationship with said predetermined plane, a thick original carriage having a support surface for a thick original, a second drive transmission means for moving said original carriage so that said support surface moves through said predetermined plane, and a drive source for driving said first and second drive transmission means, wherein said sheet original transport unit, when mounted, is actuated by said first drive transmission means, and said original carriage is movable by said second drive transmission means upon removal of said sheet original transport unit.

2. An original transport device according to claim 1, wherein said drive source normally drives said first and second drive transmission means.

3. An original transport device according to claim 1, wherein said sheet original transport unit has a transparent original guide plate disposed in said predetermined plane with said original carriage support surface.

4. An original transport device according to claim 1, wherein said sheet original transport unit has a transparent original guide plate and a pair of sheet original transport rolls having drive surfaces disposed in coplanar relationship with an upper surface of said guide plate and in said predetermined plane, said original carriage has a transparent original supporting plate defining said support surface, and said second drive transmission means has an original carriage transport roll engageable with said transparent original supporting plate to transport said original carriage, the support surface of said original carriage transport roll being lower than the surface of contact between said sheet original transport rolls by an amount corresponding to the thickness of said transparent original supporting plate.

5. An original transport device according to claim 1, further comprising first rail means mounted on said apparatus for preventing oblique movement of said original carriage, and second rail means for supporting reciprocal movement of said original carriage, wherein said original carriage has rollers driven to rotate on said rail means.

6. An original transport device according to claim 5, wherein said first rail means comprises a convex rail, said second rail means comprises a planar rail, and one of said driven rollers has a groove formed therein for engagement with the convex portion of said convex rail.

* * * * *